United States Patent Office 3,157,652
Patented Nov. 17, 1964

3,157,652
N-SULFATOALKYLSULFONAMIDO SUBSTITUTED
s-TRIAZINYL AMINO ANTHRAQUINONE DYE-
STUFFS
Kurt Weber and Max Staeuble, Basel, Switzerland, assignors to Ciba Limited, Basel, Switzerland, a company of Switzerland
No Drawing. Filed Feb. 14, 1961, Ser. No. 89,127
Claims priority, application Switzerland Mar. 1, 1960
9 Claims. (Cl. 260—249)

The present invention relates to new anthraquinone vat dyestuffs which contain two identical or different anthraquinone radicals linked together through a 1:3:5-triazine bridge, and at least one sulfonic acid sulfato alkylamide group having at least 3 carbon atoms between the sulfato group and the amide nitrogen atom.

The sulfonamide radical is advantageously attached directly to one of the two anthraquinone nuclei or to an aromatic nucleus which is bound to the triazine bridge.

Of particular interest are the vat dyestuffs containing the radical of the formula $$-SO_2-NH\left(CH_2\right)_m\left(Z\right)_{n-2}\left(CH_2\right)_q-OSO_3H$$

in which $n$ is 1 or 2, $m$ and $q$ each represents 2 or 3 and Z one of the groups —$CH_2$—, —O—, —S— or especially

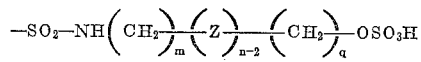

in which $p$ is a whole number of at most 6.

The dyestuffs to be used according to the invention contain advantageously at most 3 sulfonamide radicals, for example radicals of the formulae —$SO_2$—$NHCH_2CH_2CH_2CH_2OSO_3H$
—$SO_2$—$N$—$CH_2CH_2CH_2CH_2$—$OSO_3H$
      |
      $CH_3$
—$SO_2$—$NHCH_2CH_2CH_2CH_2CH_2OSO_3H$
—$SO_2$—$NHCH_2CH_2$—O—$CH_2CH_2OSO_3H$
—$SO_2$—$NH$—$CH_2CH_2$—$N$—$CH_2CH_2OSO_3H$
                |
                $CH_2CH_2OSO_3H$
—$SO_2$—$NHCH_2CH_2$—S—$CH_2CH_2$—$OSO_3H$
—$SO_2$—$NHCH_2CH_2$—$NH$—$CH_2CH_2OSO_3H$
—$SO_2$—$N$—$CH_2CH_2$—$N$—$CH_2CH_2CH_2OSO_3H$
    |            |
    $C_2H_5$     $CH_2CH_2OSO_3H$
—$SO_2$—$NHCH_2CH_2$—$N$—$CH_2CH_2OSO_3H$
                |
                $CH_3$ —$SO_2$—$NH$—$(CH_2)_3$—$N$—$CH_2CH_2OSO_3H$
                   |
                   $CH_3$
—$SO_2$—$NH$—$(CH_2)_3$—$N$—$CH_2$—$CH_2O$—$SO_3H$
                   |
                   $CH_2$—$CH_2$—O—$SO_3H$ In the dyestuffs of the invention the triazine bridge represents a 2-chloro-triazine or a 2-phenyl-, phenoxy- or phenylamino-1:3:5-triazine bridge which is bound to an anthraquinone radical through an amino group in each of the positions 4 and 6. Of particular interest are dyestuffs of the formulae

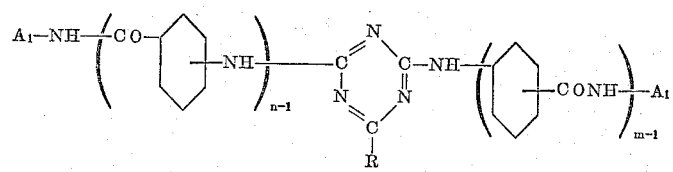

and

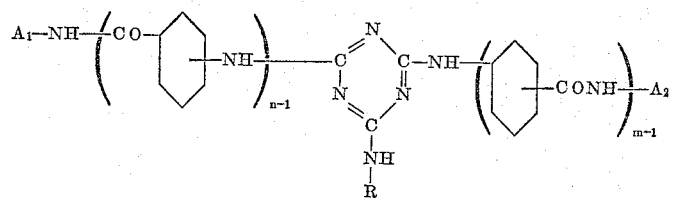

in which $n$ and $m$ each represents a whole number of at most 2, $A_1$ and $A_2$ each stands for an anthraquinone radical which may contain an acyl-amino or especially an aroylamino group, and R for a phenyl radical, and at least one of the radicals $A_1$, $A_2$ or R contains a sulfamide group of the type indicated.

The new dyestuffs are obtained by (a) Linking together two aminoanthraquinone dyestuffs by reaction with an at least dihalogenated triazine compound and choosing the starting materials in such a manner that at least one of the two anthraquinone nuclei and/or one of the aromatic nuclei which may be present in the triazine compound contains a sulfonic acid sulfato-alkylamide group having at least 3 carbon atoms between the sulfato group and the amide nitrogen atom, or (b) Esterifying corresponding deystuffs which contain a hydroxyl group instead of the sulfato group with a sulfating agent, or (c) Amidating anthraquinone vat dyestuffs, which contain two identical or different anthraquinone radicals linked together through a 1:3:5-triazine bridge, and at least one sulfonic acid halide group, with a sulfatoalkylamine which contains at least 3 carbon atoms between the sulfato group and the amino group reacting with the sulfo halide group.

The anthraquinone compounds serving as starting materials in modification (b) of the process and which contain a sulfonic acid-hydroxyalkylamide group of the type indicated, for example a group —$SO_2$—NH—R—OH in which R represents an alkylene chain which may be interrupted by hetero atoms and which has at least 3 carbon atoms, are advantageously obtained by reacting one of the sulfohalides used as starting material in modification (c) of the process with a hydroxyalkylamine, especially one of the formula $$NH_2-R-OH$$

in which R has the meaning given above.

The starting dyestuffs may contain the sulfonic acid halide group either in one or both of the anthraquinone radicals or in the phenyl radical which may be bound to the triazine nucleus. In the latter case the phenyl radical may be further substituted, for example by a hydroxyl or alkoxy group in ortho-position.

The preparation of the dyestuffs according to modification (a) of the process is advantageously carried out by condensing 2 identical or different anthraquinones which contain acylatable amino groups, with a dihalogen-triazine, more especially a 2:4-dichlorotriazine, which contains in 6-position a hydrogen atom, a halogen atom or an aryl radical; and in the aryl radical a sulfonic acid sulfatoalkylamide group of the type indicated must be present if no such sulfamide group is present in the aminoanthraquinones used.

When cyanuric chloride is used, a dianthraquinonyl-amino-chlorotriazine is obtained in which the chlorine at the triazine radical may be replaced by reaction with ammonia, or particularly an amine of the formulae

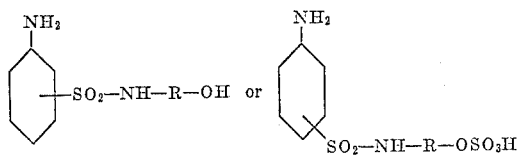

As examples of aminoanthraquinones there may be mentioned: 1-aminoanthraquinone, 1-amino-4-methoxy-anthraquinone, 1-aminoanthraquinone-6-sulfonic acid-N-(δ - hydroxybutyl) - amide, 1 - aminoanthraquinone - 7-sulfonic acid-N-(δ-hydroxybutyl)-amide, 1-amino-4-benzoylaminoanthraquinone, 1 - amino - 5 - benzoylamino-anthraquinone or 1-amino-8-benzoylaminoanthraquinone. The latter may be substituted in the benzene radicals, for example by halogen atoms, alkoxy, alkyl, trifluoromethyl, sulfonamide or alkylsulfonyl groups. Such aminoanthraquinones also come into consideration which contain fused-on carbocyclic or heterocyclic rings, for example 4 - amino - anthraquinone - 2:1(N) - acridone, 5-amino-1:9-isothiazoleanthrone, 4- or 5-amino-anthra-pyridimine, also amino-dianthrimidecarbazoles, amino-pyranthrones or aminodibenzanthrones. There may also be mentioned 1:4-diamino-2-acylanthraquinones, for example 1:4-diamino-2-benzoylanthraquinone, and particularly 1:4-diamino-2-acetyl-anthraquinone of which it is known that under normal conditions the amino group only is acylatable in the 4-position.

The compounds containing the radical of the formula $$-SO_2-NH-R-OH$$

are advantageously treated with an agent yielding the sulfuric acid radical. This is advantageously carried out with concentrated sulfuric acid in the cold, for example between 0 and 30° C., preferably with at least 5 parts of sulfuric acid to 1 part of dyestuff. Sulfating may also be performed with oleum or chlorosulfonic acid or their addition compounds with tertiary bases or amides, for example pyridine, triethylamine or dimethylformamide.

The condensations according to the invention which are necessary in modifications (a) and (c) are preferably carried out in the presence of an acid-binding agent, such as an alkali metal hydroxide or alkali metal carbonate in an organic or aqueous medium.

The resulting dyestuffs may be isolated from the reaction mixture and processed to useful dry dyestuff preparations. Isolation is performed advantageously by filtration. The isolated dyestuffs may be dried by the addition of extenders having a neutral or weakly alkaline reaction; drying is preferably performed at not too high a temperature, if necessary under reduced pressure.

The new dyestuffs are suitable for dyeing many different materials, particularly for dyeing or printing textile materials of natural or regenerated cellulose, by the customary vatdyeing or printing processes. There are obtained level, strong dyeings and prints which are distinguished by excellent fastness to light and wetting.

It is assumed that in the dyebath or on the fiber under the influence of the alkali the radical —OX is split off possibly with the formation of a heterocyclic 5- or 6-ring with the nitrogen atom of the sulfonamide group as hetero atom, that is to say the dyestuff is converted into an insoluble form.

As compared with conventional vat dyestuffs, the vat dyestuffs of the present invention have the great advantage of being much more rapidly vattable. In addition, considerably fewer reducing agents are required for vatting. Their easy vattability makes the dyestuffs of the invention especially suitable for continuous dyeing.

The following examples illustrate the invention, the parts and percentages being by weight unless otherwise stated.

*Example 1*

4.1 parts of 4-aminobutanol-(1) in 20 parts of nitrobenzene are slowly added dropwise at 120–125° C. to 13 parts of the dyestuff sulfochloride of the formula

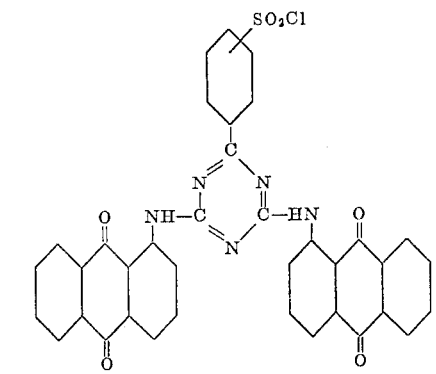

obtained by condensing the sulfochloride of 2-phenyl-4:6-dichlorotriazine-(1:3:5) with 2 mols of 1-amino-anthraquinone in nitrobenzene, in 140 parts of nitrobenzene and the mixture is stirred for 2 hours at 125° C. and 1 hour at 140° C. After cooling, the dyestuff which has crystallized out in the form of small fine needles is filtered off, washed with benzene, alcohol and water, and dried.

10 parts of the resulting condensation product are introduced into 180 parts of sulfuric acid of 96% strength at 0 to 5° C., and dissolved. The solution is then poured into approximately 800 parts of ice-water and filtered off. The moist filter cake is suspended in about 500 parts of water and neutralized with sodium hydroxide solution. The reaction product is then filtered off and dried in vacuo at 60 to 70° C.

The new dyestuff in its free acid state corresponds to the formula

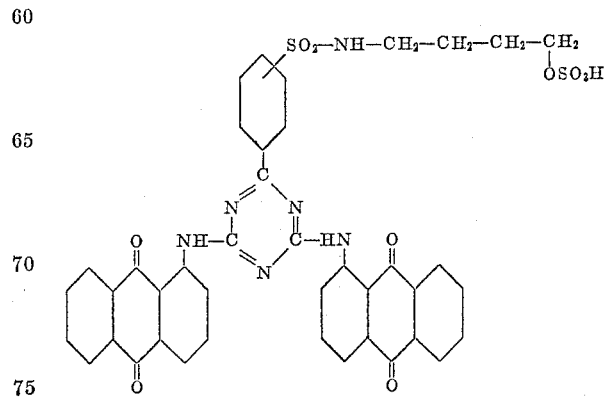

It may be used as follows:

0.75 part of the dyestuff is pasted with 250 parts of warm water. The resulting dyestuff suspension is added to a solution, heated to 50° C., of 10 parts by volume of sodium hydroxide solution of 30% strength and 6 parts of sodium hydrosulfite in 1750 parts of water, vatting occurring immediately. In the resulting dyebath 50 parts of cotton are dyed for 45 minutes at 50 to 60° C. with the addition of 40 parts of sodium chloride. After dyeing, the dyed goods are oxidized, rinsed, acidified, rinsed thoroughly again and soaped at the boil. A clear greenish yellow dyeing with excellent fastness properties is obtained.

The sulfochloride of 2-phenyl-4:6-dichlorotriazine-(1:3:5) may be obtained by sulfochlorinating 2-phenyl-4:6-dihydroxy-triazine-(1:3:5) with chlorosulfonic acid and treating the sulfochloride of 2-phenyl-4:6-dihydroxy-triazine with phosphorus pentachloride in phosphorous oxychloride.

Example 2

1.8 parts of 4-aminobutanol-(1) in 20 parts of nitrobenzene are slowly added dropwise at 120–125° C. to 7 parts of the dyestuff sulfochloride of the formula is performed as described in Example 1. When applied to cotton and regenerated cellulose as described in Example 1, clear golden orange dyeings of excellent fastness properties are obtained.

Example 3

7 parts of the dyestuff sulfochloride of the formula

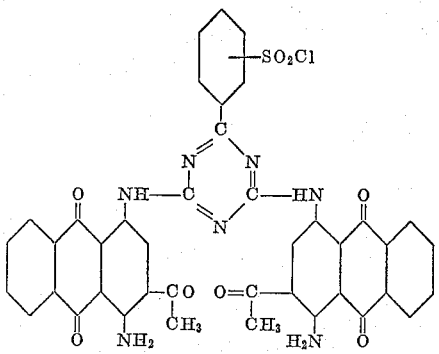

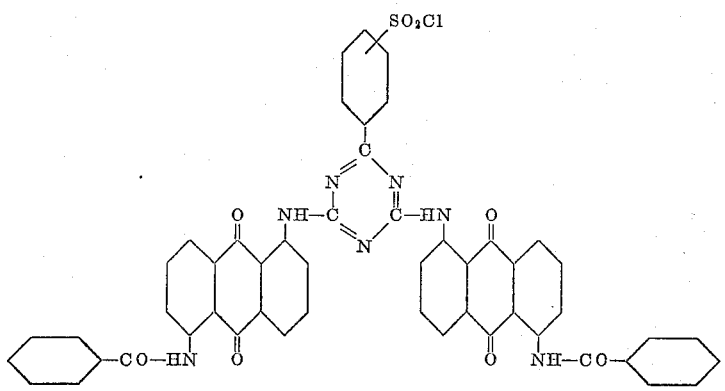

obtained by condensing the sulfochloride of 2-phenyl-4:6-dichlorotriazine-(1:3:5) with 2 mols of 1-amino-5-benzoylaminoanthraquinone in nitrobenzene, in 100 parts of nitrobenzene, and the mixture is stirred for 4 hours at 130° C. and for 1 hour at 140° C. After cooling, the dyestuff which crystallizes out is filtered off, washed with benzene, alcohol and water and dried.

Conversion into the dyestuff of the formula obtained by condensing the sulfochloride of 2-phenyl-4:6-dichlorotriazine-(1:3:5) with 2 mols of 1:4-di-amino-2-acetyl-anthraquinone in nitrobenzene, are condensed with 4-amino-butanol as described in Example 2 and esterified with sulfuric acid as described in Example 1.

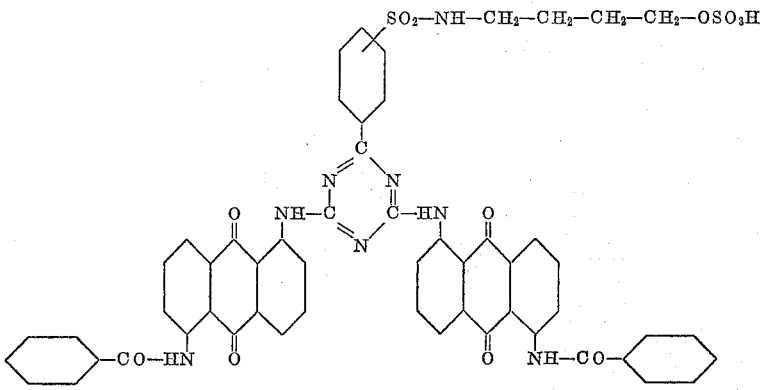

The new dyestuff of the formula

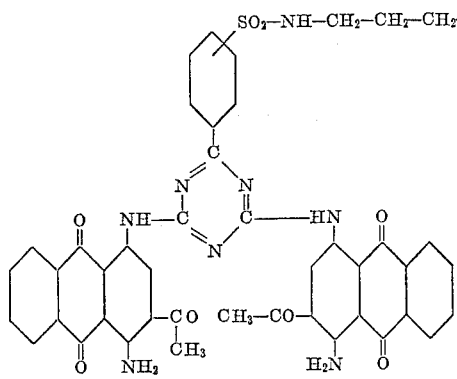

dyes cotton and regenerated cellulose blue tints having excellent fastness properties.

*Example 4*

11.2 parts of the condensation product of 2 mols of 1-aminoanthraquinone with 1 mol of cyanuric chloride are heated at 180 to 185° C. in 120 parts of nitrobenzene with 14.6 parts of 3-aminobenzene-(δ-hydroxybutyl)-sulfonamide for 6 hours with stirring. After cooling, the reaction mixture is filtered, washed with benzene, alcohol and water, and dried.

10 parts of the resulting condensation product are slowly introduced into 180 parts of sulfuric acid of 96% strength at 0 to 5° C. with stirring, and dissolved. The product is worked up as described in Example 1. The new dyestuff in its free acid state corresponds to the formula

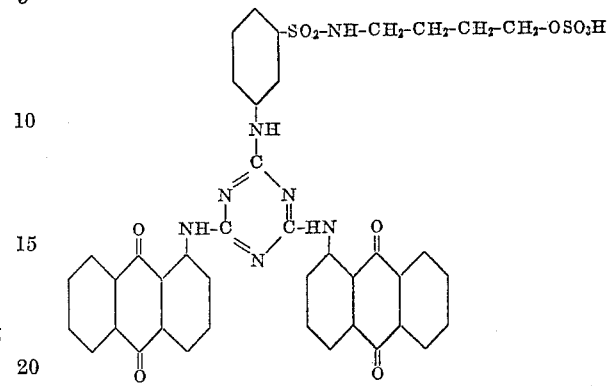

Cotton and regenerated cellulose are dyed by the method described in Example 1 yellow tints of excellent fastness properties.

Similar dyestuffs are obtained carrying out the condensation with the amines listed in column I of the Table below instead of with 3-aminobenzene-(δ-hydroxybutyl)-sulfonamide, and converting the resulting dyestuffs into the sulfuric acid semiesters as described; the tints are shown in column II.

| I | II |
|---|---|
| $NH_2$—⌬—$SO_2$—NH—$CH_2$—$CH_2$—$CH_2OH$ | Yellow. |
| $NH_2$—⌬—$SO_2$—NH—$CH_2$—$CH_2$—$CH_2OH$ | Do. |
| $NH_2$—⌬—$SO_2$—NH—$CH_2$—$CH_2$—NH—$CH_2$—$CH_2OH$ | Do. |
| $NH_2$—⌬—$SO_2$—N($CH_3$)—$CH_2$—$CH_2$—NH—$CH_2$—$CH_2OH$ | Do. |
| $NH_2$—⌬—$SO_2$—N($CH_3$)—$CH_2$—$CH_2$—N($CH_3$)—$CH_2$—$CH_2OH$ | Do. |
| $NH_2$—⌬—$SO_2$—NH—$CH_2$—$CH_2$—N($CH_2$—$CH_2OH$)$_2$ | Do. |
| $NH_2$—⌬—$SO_2$—N($CH_3$)—$CH_2$—$CH_2$—N($CH_2$—$CH_2OH$)$_2$ | Do. |
| $NH_2$—⌬—$SO_2$—NH—$CH_2$—$CH_2$—$CH_2$—N($CH_3$)—$CH_2$—$CH_2OH$ | Do. |
| $NH_2$—⌬—$SO_2$—NH—$CH_2$—$CH_2$—$CH_2$—N($CH_2$—$CH_2OH$)$_2$ | Do. |

Example 5

7.8 parts of 2:4-bis-(4'-carboxy-phenylamino)-6-chloro-1:3:5-triazine are heated at 110° C. in 200 parts of dry nitrobenzene with 8.0 parts of thionyl chloride and 0.5 part of anhydrous pyridine for 3 hours with stirring. After distilling off the excess thionyl chloride in vacuo, 9.0 parts of 1-aminoanthraquinone are added at 100° C. and the reaction mixture heated for 3 hours at 130 to 140° C. After cooling to room temperature, the yellow condensation product is isolated by filtration, washed with nitrobenzene and methanol and dried.

8.0 parts of the condensation product are suspended in 100 parts of nitrobenzene and 6.0 parts of 3-aminobenzene-(δ-hydroxybutyl)-sulfonamide dissolved in 10 parts of acetone are added. The reaction mixture is heated to 180 to 185° C. and stirred for 6 hours at that temperature. After cooling to room temperature, the reaction product is isolated by filtration, washed with acetone and then with water and dried.

10 parts of the so-obtained product are slowly added to 180 parts of sulfuric acid monohydrate at 8 to 10° C. and dissolved. The solution is then poured into about 800 parts of ice-water and filtered off. The moist filter cake is suspended in 500 parts of water and neutralized with sodium hydroxide solution, filtered and dried in vacuo at 60 to 70° C.

The dyestuff of the formula which may be obtained by condensing m-nitro-benzenesulfochloride with N:N-dihydroxyethyl-propylenediamine-(1:3) and subsequent reduction, there is obtained after esterification with sulfuric acid the dyestuff of the formula

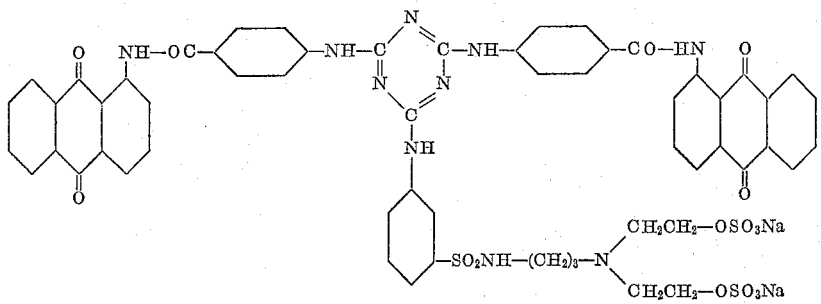

This dyestuff is vattable in the cold and dyes cotton and regenerated cellulose yellow tints having very good fastness properties.

Example 6

7.8 parts of 2:4 - bis - (4' - carboxy - phenylamino) - 6-chloro-1:3:5-triazine are dissolved in 200 parts of nitrobenzene with 8.0 parts of thionyl chloride by heating to 110° C. in the course of 3 hours to form the corresponding dicarboxylic acid chloride. After distilling off the excess thionyl chloride in vacuo, 10.7 parts of 1-amino-5-nitro-anthraquinone are added at 100° C. and the mixture is heated for 6 hours at 130 to 140° C. 10 parts of aniline are then added and the mixture stirred for 1 hour. After cooling, the yellow condensation product is isolated by filtration and then reduced to the diamine with excess phenylhydrazine in ortho-dichlorobenzene. 3.3 parts of the amine are then dissolved in 100 parts of boiling nitrobenzene and, after cooling to 130° C., treated with a warm solution of 2.8 parts of para-benzoic acid sulfodichloride in 50 parts of nitrobenzene. 0.3 part of a hydrous pyridine is then added and the mixture heated for 4 hours at 130° C. while stirring thoroughly. After cool-

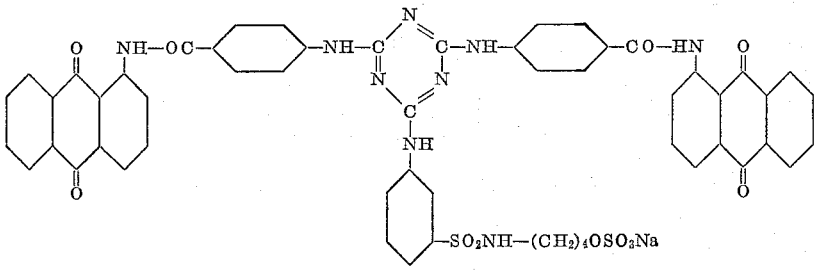

is vattable in the cold and dyes cotton and regenerated cellulose from an alkaline hydrosulfite vat fast yellow tints.

If instead of using 6.0 parts of 3-aminobenzene-sulfonic acid-N-(δ-hydroxybutyl)-amide there is used an equimolecular proportion of 3-aminobenzene-sulfonic acid-N:γ-(N':N'-bis-hydroxyethyl)-aminopropylamide of the formula

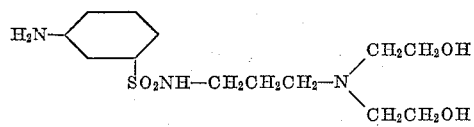

ing, the yellow dyestuff is filtered off and the filtrate stirred into 100 parts of nitrobenzene at 120 to 125° C. 2.7 parts of 4-aminobutanol in 30 parts of nitrobenzene are added dropwise in the course of one hour, and heating is continued with stirring for 6 hours at 120 to 125° C. and for a further 2 hours at 145° C. After cooling, the yellowish brown dyestuff suspension is isolated by filtration, washed with alcohol and water, and dried at 70° C. in vacuo.

10 parts of the above product are dissolved slowly in 200 parts of sulfuric acid monhydrate at 8 to 10° C. with stirring. The solution is then poured on to icewater and filtered off. The moist filter cake is suspended in 500 parts of water and neutralized with sodium hydroxide solution, filtered and dried at 60 to 70° C. in vacuo.

The dyestuff of the probable formula

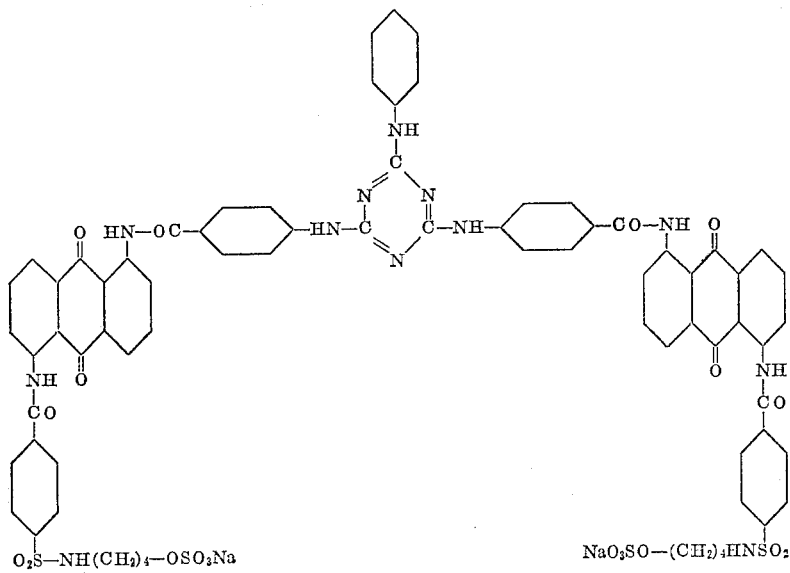

dyes cotton and regenerated cellulose fast yellow tints.

If instead of using 2:4-bis-(4'-carboxyphenylamino)-6-chloro-1:3:5-triazine in this example there is used the same quantity of 2:4-bis - (3'-carboxyphenylamino)-6-chloro-1:3:5-triazine, a dyestuff is obtained having similarly good properties.

*Example 7*

8.4 parts of aminoacedianthrone are heated with 1.8 parts of cyanuric chloride in 150 parts of dry nitrobenzene for 9 hours at 170 to 180° C. with stirring until condensation is complete. 6.0 parts of 3-amino-benzene-sulfonic acid-N-(α-hydroxybutyl)- amide diluted with 10 parts of dioxane are then added dropwise in the course of one hour. The reaction mixture is stirred for 6 hours at 180° C. and then cooled to room temperature. The dyestuff is isolated by filtration, washed with alcohol and dried at 70° C. in vacuo.

10 parts of the so-obtained product are added slowly with stirring to 200 parts of sulfuric acid monohydrate at 8 to 10° C., and dissolved. The solution is then poured on to 1000 parts of ice-water and filtered off. The moist filter cake is suspended in 400 parts of water and neutralized with sodium hydroxide solution, filtered off and dried at 60 to 70° C. in vacuo.

The dyestuff of the formula

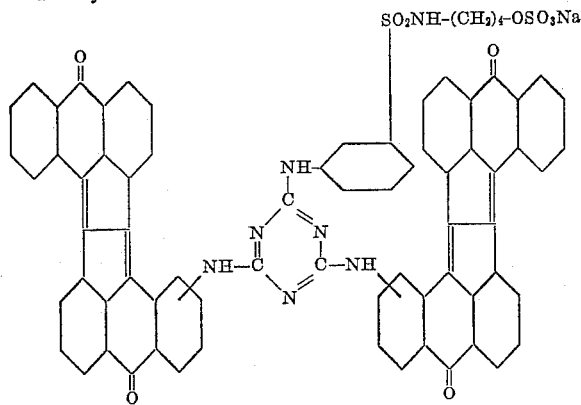

dyes cotton and regenerated cellulose from an alkaline hydrosulfite vat very fast brown tints.

*Example 8*

13.6 parts of the condensation product from 1 mol of 4:6-dichloro-2-[(5')-benzoylamino-anthraquinonyl - (1')-amino]-1:3:5-triazine and 1 mol of 1-aminoanthraquinone (obtained by condensation in nitrobenzene at 140° C.) are heated with 14.6 parts of 3-aminobenzene-(δ-hydroxybutyl)-sulfonamide for 6 hours at 180–185° C. with stirring. After cooling, the reaction product is filtered off, washed with benzene, alcohol and water and dried.

10 parts of the so-obtained condensation product are added slowly to 180 parts of sulfuric acid of 96% strength at 0 to 5° C. with stirring, and dissolved. The product is worked up as described in Example 1. The new dyestuff in its free acid state corresponds to the formula

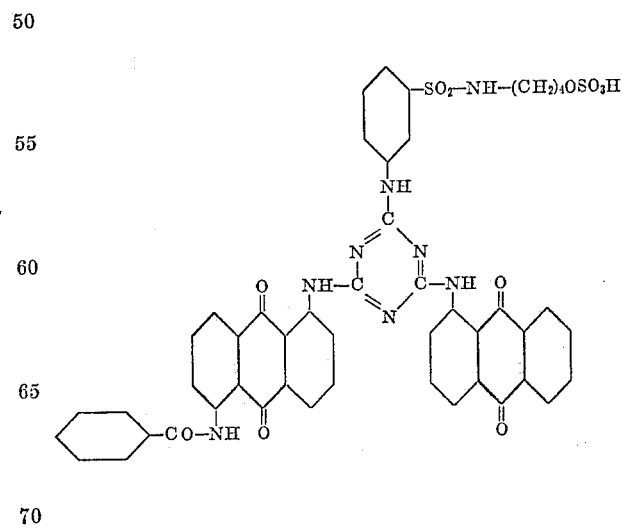

Cotton and regenerated cellulose are dyed by the method described in Example 1 golden yellow tints of excellent fastness.

Example 9

18.3 parts of the dyestuff of the formula

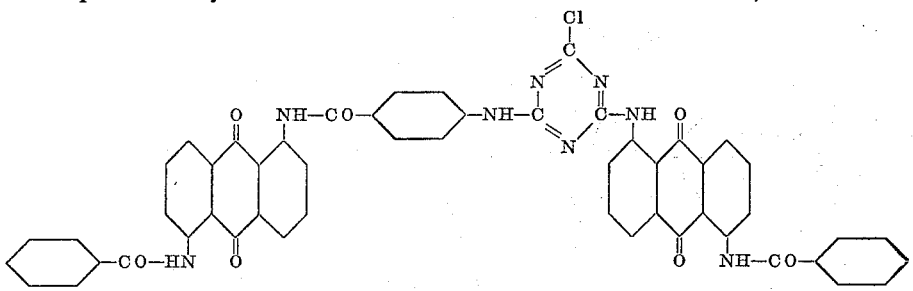

are heated in 180 parts of nitrobenzene with 14.6 parts of 3-aminobenzene-(δ-hydroxybutyl)-sulfonamide for 6 hours at 180–185° C. with stirring. After cooling, the reaction product is filtered off, washed with benzene, alcohol and water, and dried.

10 parts of the so-obtained condensation product are slowly added to 180 parts of sulfuric acid of 96% strength at 0 to 5° C. with stirring, and dissolved. The product is worked up as described in Example 1. The new dyestuff in its free acid form corresponds to the formula

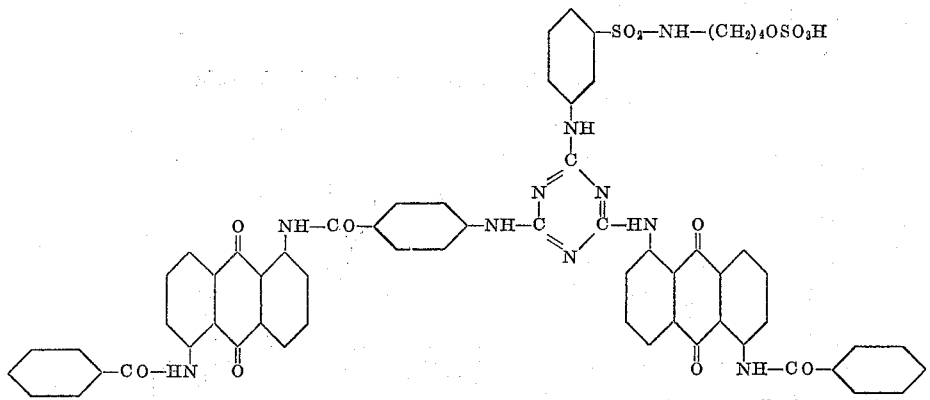

Cotton and regenerated cellulose are dyed by the method described in Example 1 golden orange tints of excellent fastness.

Example 10

10 parts of the compound of the formula

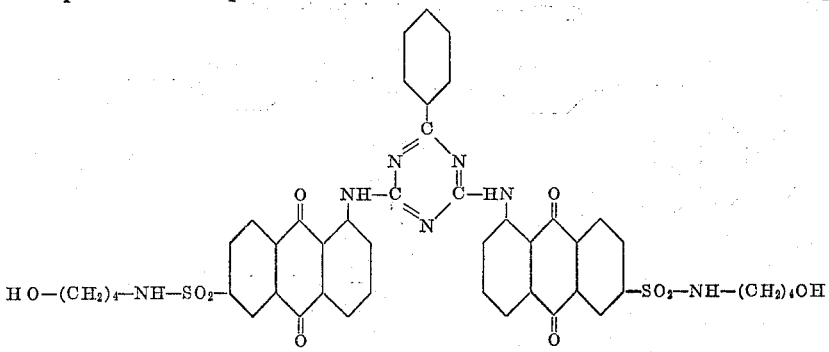

are added at 15 to 25° C. to 100 parts of concentrated sulfuric acid, and dissolved. The reaction solution is poured on to ice-water and filtered off. The moist filter cake is suspended in about 1000 parts of water and neutralized with sodium hydroxide solution. After adding 20 parts of sodium chloride, the reaction product is filtered with suction and dried at 60 to 70° C. in vacuo.

The new dyestuff in its free acid state corresponds to the formula

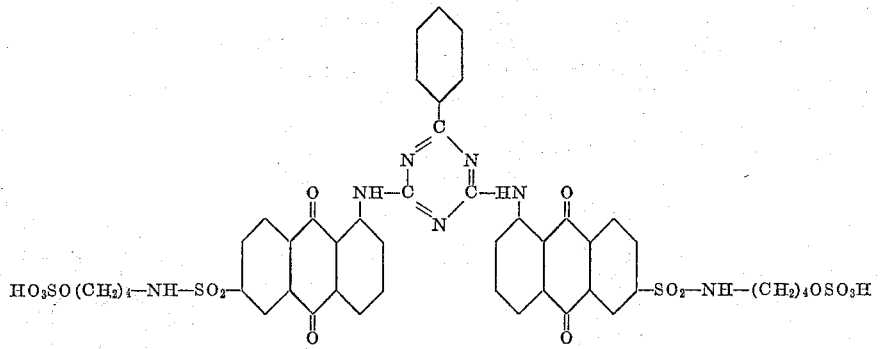

Cotton and regenerated cellulose are dyed by the method described in Example 1 golden orange tints of excellent fastness.

The dyestuff of Formula 1 may be prepared as follows:

14 parts of 1-aminoanthraquinone-6-(4′-hydroxybutyl)-sulfonamide (prepared by condensation of 1-nitroanthraquinone-6-sulfochloride with 4-aminobutanol and reduction with sodium sulfohydrate in aqueous solution) are heated in 150 parts of nitrobenzene with 4.5 parts of 2-phenyl-4:6-dichlorotriazine-(1:3:5) for 5 hours at 150–155° C. with stirring. After cooling the crystalline dyestuff is filtered off, washed with alcohol and dried.

What is claimed is:

1. A vat dyestuff of the formula

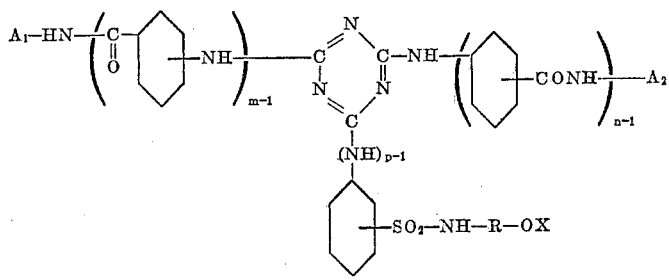

in which $A_1$ and $A_2$ each is α-anthraquinolyl, $m$, $n$ and $p$ each represents a whole positive number up to 2 and R represents an alkylene chain containing 4 to 5 carbon atoms and X is a sulfo group bound to the —O— atom through its sulfur atom.

2. A dyestuff as claimed in claim 1 which contains a benzoylamino group in at least one of the α-positions of the anthraquinone radicals $A_1$ and $A_2$.

3. The vat dyestuff of the formula

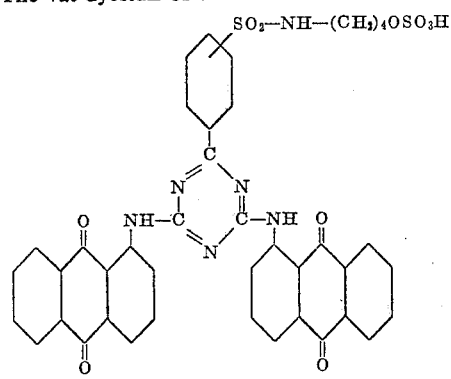

4. The vat dyestuff of the formula

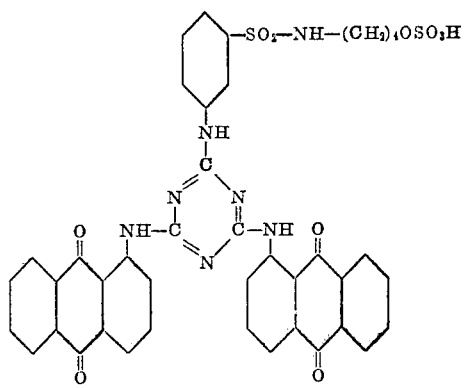

5. The vat dyestuff of the formula

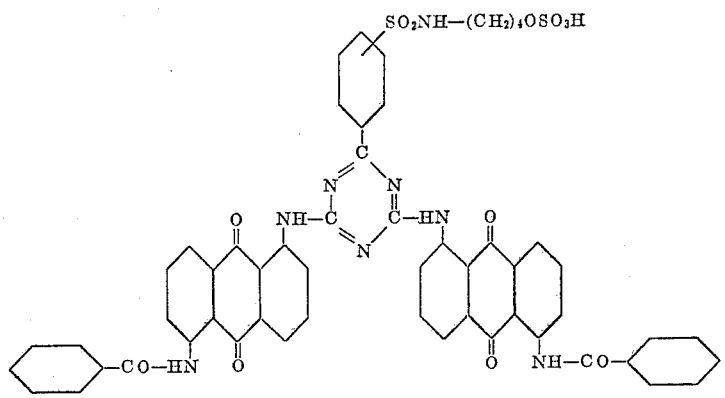

6. The vat dyestuff of the formula

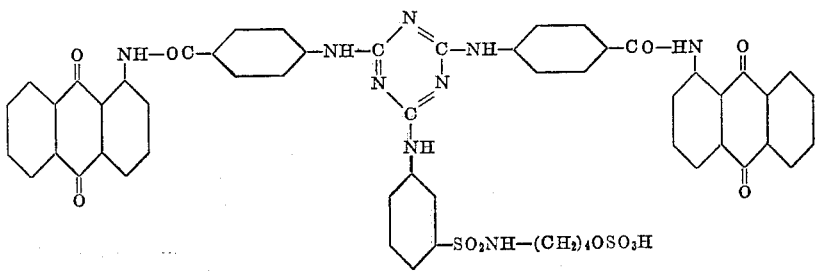

7. The vat dyestuff of the formula

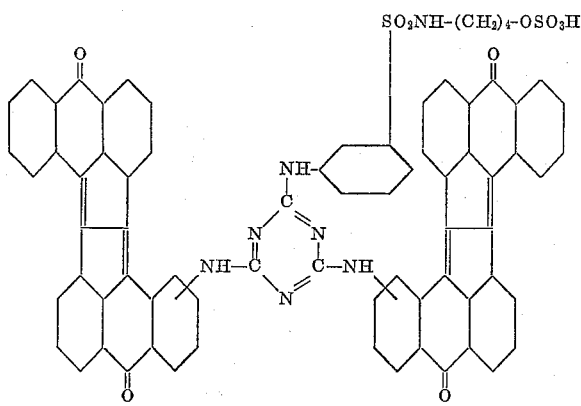

8. A vat dyestuff of the formula

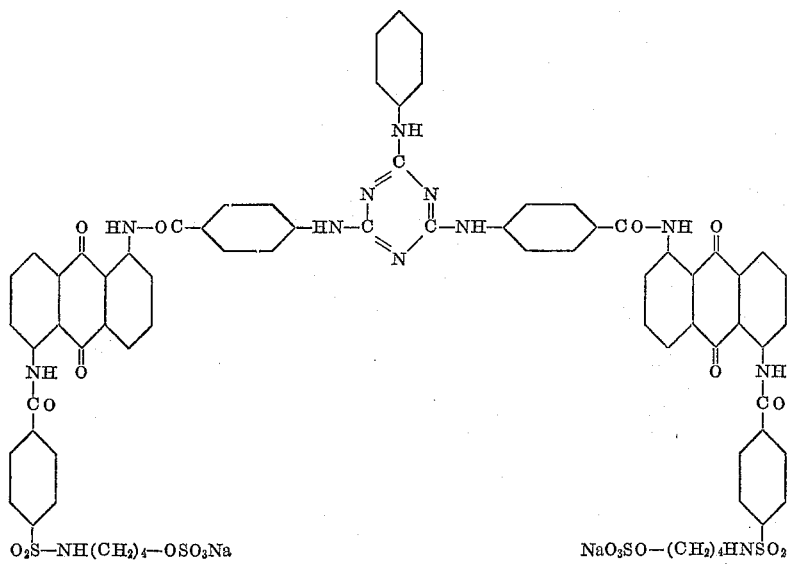

9. A vat dyestuff of the formula

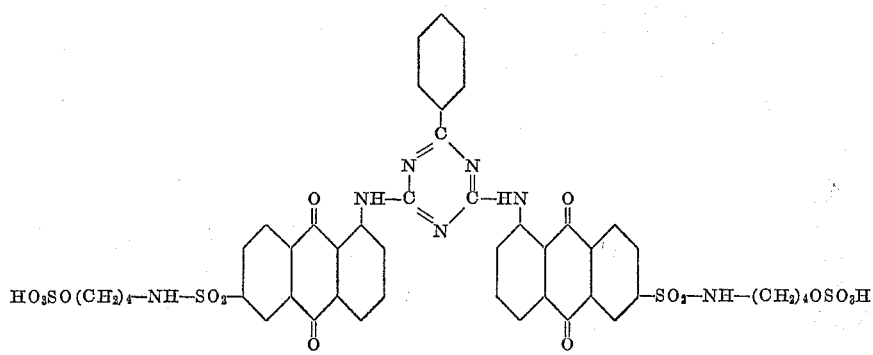

References Cited in the file of this patent
UNITED STATES PATENTS

| | | |
|---|---|---|
| 1,994,602 | Wieners | Mar. 19, 1935 |
| 2,978,289 | Barker et al. | Apr. 4, 1961 |
| 3,029,123 | Putter et al. | Apr. 10, 1962 |
| 3,043,650 | Wegmann et al. | July 10, 1962 |
| 3,046,075 | Kantner et al. | July 24, 1962 |
| 3,066,005 | Wedemeyer et al. | Nov. 2, 1962 |

FOREIGN PATENTS

| | | |
|---|---|---|
| 563,199 | Belgium | June 13, 1958 |
| 784,926 | Great Britain | Oct. 16, 1957 |

OTHER REFERENCES

Wegmann: Textil-Praxis, October 1958, p. 1056.

Hess et al.: "Nature," vol. 183, page 260, Jan. 24, 1959.

Lubs: "Chemistry of Synthetic Dyes and Pigments," Monograph Series 127, Reinhold Pub. Corp., New York, 1955, pages 522 and 612.

UNITED STATES PATENT OFFICE
CERTIFICATE OF CORRECTION

Patent No. 3,157,652                      November 17, 1964

Kurt Weber et al.

It is hereby certified that error appears in the above numbered patent requiring correction and that the said Letters Patent should read as corrected below.

Column 15, lines 6 to 20, the upper left-hand portion of the formula should appear as shown below instead of as in the patent:

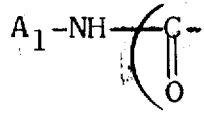

same column 15, line 21, for "α-anthraquinolyl" read -- α-anthraquinonyl --.

Signed and sealed this 4th day of May 1965.

(SEAL)
Attest:

ERNEST W. SWIDER                      EDWARD J. BRENNER
Attesting Officer                   Commissioner of Patents